(12) United States Patent
Morley et al.

(10) Patent No.: US 8,621,451 B1
(45) Date of Patent: Dec. 31, 2013

(54) RESPONSIVENESS OF A COMPUTING DEVICE IN CONNECTION WITH SOFTWARE DISTRIBUTION

(75) Inventors: David Bradford Morley, Highland, UT (US); Blake Alan Thompson, Saratoga Springs, UT (US)

(73) Assignee: Crimson Corporation, Dover, DE (US)

( * ) Notice: Subject to any disclaimer, the term of this patent is extended or adjusted under 35 U.S.C. 154(b) by 57 days.

(21) Appl. No.: 13/354,205

(22) Filed: Jan. 19, 2012

(51) Int. Cl.
*G06F 9/445* (2006.01)

(52) U.S. Cl.
USPC .......................................... 717/172; 717/177

(58) Field of Classification Search
None
See application file for complete search history.

(56) References Cited

U.S. PATENT DOCUMENTS

2002/0033844 A1* 3/2002 Levy et al. .................... 345/744

* cited by examiner

*Primary Examiner* — Chuck Kendall
(74) *Attorney, Agent, or Firm* — Austin Rapp & Hardman

(57) ABSTRACT

A computing device configured for improving the responsiveness of a computing device in connection with software distribution is described. The computing device includes a processor and executable instructions stored in memory that is in electronic communication with the processor. The computing device receives a return code and package information from a remote computing device. The computing device also looks up a code mapping in a cache, wherein the code mapping is based on the return code. The computing device further stores the package information in a database. The computing device furthermore displays the code mapping and the package information.

14 Claims, 7 Drawing Sheets

Database 534

| Return Codes 536 | Messages 538 | Code Types 540 |
|---|---|---|
| 0 | Successful install | Success |
| 1 | Data is invalid | Failed |
| 2 | Fatal error during installation | Failed |
| 3 | User canceled installation | Failed |
| 4 | Parameter is invalid | Failed |
| ... | ... | ... |
| n | Message n | Code type n |

FIG. 5

RESPONSIVENESS OF A COMPUTING DEVICE IN CONNECTION WITH SOFTWARE DISTRIBUTION

TECHNICAL FIELD

The present disclosure relates generally to computers and computer-related technology. More specifically, the present disclosure relates to improving the responsiveness of a computing device in connection with software distribution.

BACKGROUND

Computer and communication technologies continue to advance at a rapid pace. Indeed, computer and communication technologies are involved in many aspects of everyday life. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. On a network, one or more servers may provide data and services to other computers. The one or more servers may also be responsible for managing other computers. A computer network may include hundreds or even thousands of computers.

Most companies have one or more computer networks and also make extensive use of the Internet. The productivity of employees often requires human and computer interaction. Improvements in computers and software have been a force for bringing about great increases in business and industrial productivity.

As the use of computers has increased, so has the need to manage and update computers, especially in a controlled environment. Continual management of computers is one current challenge. For example, maintenance, monitoring and general life-cycle management become increasingly difficult as the number of devices on a network increases.

BRIEF DESCRIPTION OF THE DRAWINGS

FIG. 5 is a diagram illustrating one configuration for code mapping in a database;

DETAILED DESCRIPTION

Figure 1:
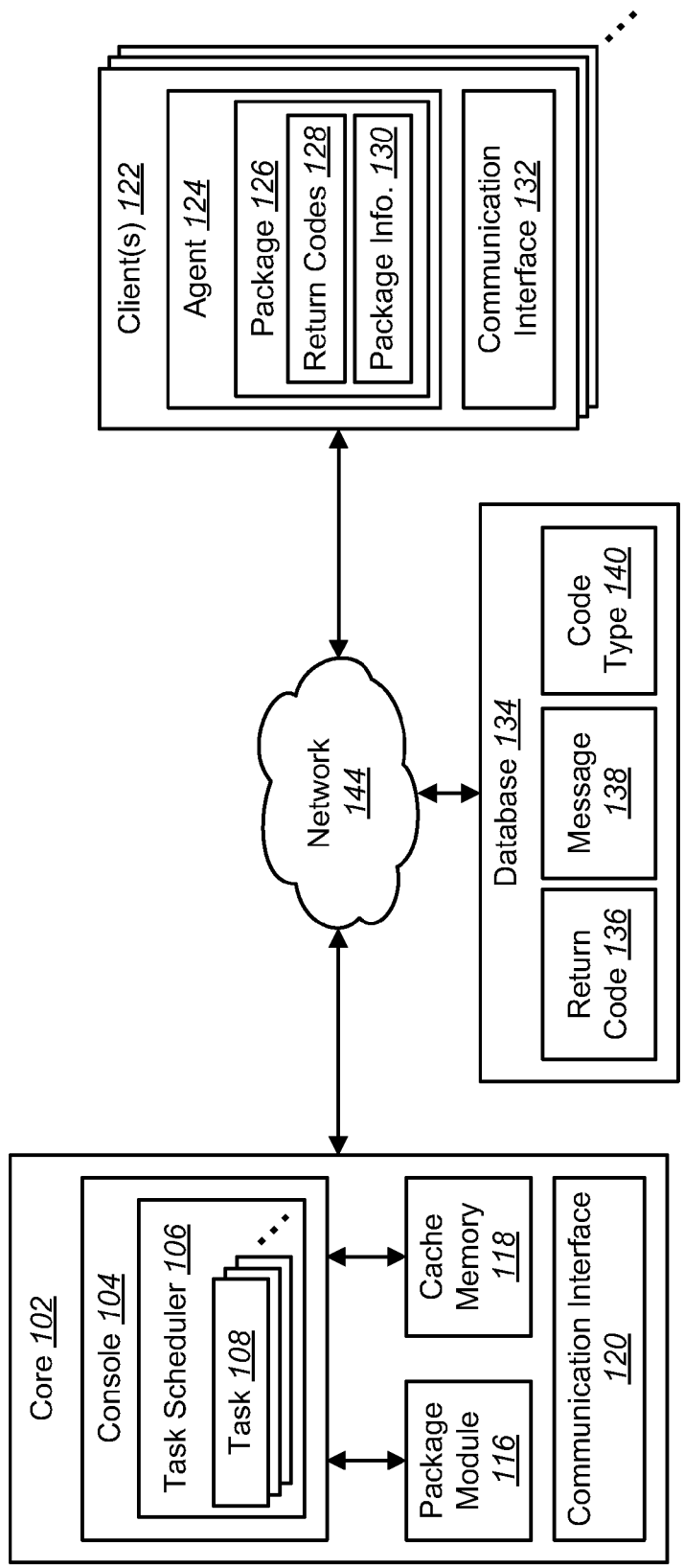
FIG. 1 is a block diagram illustrating one configuration in which systems and methods for improving the responsiveness of a computing device in connection with software distribution may be implemented.

A computing device configured for improving responsiveness in connection with software distribution is described. The computing device includes a processor and executable instructions stored in memory that is in electronic communication with the processor. The computing device receives a return code and package information from a remote computing device. The computing device also looks up a code mapping in a cache. The code mapping is based on the return code. The computing device additionally stores the package information in a database. The computing device further displays the code mapping and the package information.

The code mapping may include the return code, a message and a code type. Looking up the code mapping may return a plurality of code mappings to be stored in the cache. The code mapping may be based on a task and/or received package information.

Receiving the return code and package information from the remote computing device may be in response to the computing device sending a software package to the remote computing device. The return code may be received in response to a request from the computing device.

The instructions may be further executable to discard subsequently received package information. The instructions may be further executable to display the code mapping and the package information on a task scheduler. The task scheduler may be part of LANDesk Management Suite.

A method for improving responsiveness of a computing device in connection with software distribution is also described. The method includes receiving a return code and package information from a remote computing device. The method also includes looking up a code mapping in a cache. The code mapping is based on the return code. The method additionally includes storing the package information in a database. The method further includes displaying the code mapping and the package information.

A non-transitory computer-readable medium for improving responsiveness of a computing device in connection with software distribution is also described. The computer-readable medium includes instructions for receiving a return code and package information from a remote computing device. The computer-readable medium also includes instructions for looking up a code mapping in a database. The code mapping is based on the return code. The computer-readable medium further includes instructions for storing the package information in a database. The computer-readable medium additionally includes instructions for displaying the code mapping and the package information.

The systems and methods disclosed herein may allow for improving the responsiveness of a computing device in connection with software distribution. In one example, improving responsiveness may occur with proprietary technology such as with LANDesk Management Suite.

Clients on a managed network require continual maintenance, monitoring and general life-cycle management. For example, a recently released security patch needs to be applied to each and every client on the network as soon as possible. If not, known vulnerabilities may compromise clients and possibly the network. Each client may be controlled by a core server (core). For example, the core may be an administrative system, a host or another type of computing device. In some instances, the core may include peer or child computing devices that share management responsibilities of the managed network.

In managing clients, the core may perform a Software Distribution (SWD). The core may accomplish this through the use of a software distribution module. In some configurations, the software distribution module may be a component of a management suite, such as LANDesk Management Suite (LMS). The software distribution module may push out updates of software packages to clients on the network. In some cases the software distribution module may monitor and receive status updates from multiple clients undergoing a software update.

In software distribution, there can be a lot of information that needs to be updated in real time so that accurate information can be given to an end user, such as a system administrator. However, portions of this updated data are often static in nature. Thus, when an end user requests a status update or when information is being automatically updated in real time, portions of the data shown to the user will be redundant. In some instances, the redundant data may be strings of data, such as success strings or failure strings. In other instances, this redundant data may be object names and/or descriptions. Redundant data may also cause redundant operations to be performed by the core.

Because of redundant data and redundant operations, software distribution may not currently perform as efficiently as possible. This problem increases as the number of devices, software packages, tasks, queries, etc. increase. Thus, improving the responsiveness of a computing device in connection with software distribution, such as the core, may be beneficial.

In one configuration, using specialized caching techniques on the core may allow the software distribution component to perform more efficiently. Thus, the core responds more rapidly when accessing and displaying software, tasks and information than it would without specialized caching techniques.

For example, improved responsiveness may be obtained by delaying the loading of information. In other words, the core may only look up and load information from a database at the request of a user. For instance, the user may request a status update regarding a task or a software package and the core loads the requested information upon that request.

Improved responsiveness may also be obtained by further storing the loaded information in a memory cache. Thus, once the information is loaded from a database, it may be stored in a memory cache. In this case, the same information may be retrieved out of memory instead of accessing the database. Accessing information from memory may be significantly faster than accessing the same data from a database, especially if the data is redundant.

As another example, improved responsiveness may be obtained by using smart caching routines. In this instance, the term "smart" refers to the core's ability to determine redundant information and more efficiently process that redundant data. For example, the core may receive redundant data from a variety of devices, objects and/or clients. Further, the core may determine the data to be redundant and use a smart cache to access the data. Accessing redundant data from the smart cache allows the core to respond more rapidly than if it had to access the data from a database.

In another configuration, a user may request a status update regarding a specific task on the core. The user may use a console application located on the core. The console may manage clients on the network. For example, the console may be a management application. The user may select a task managed by the console. In some instances, the console may include a task manager and one or more tasks may be located within the task manager, which may govern multiple tasks.

Upon selection of a specific task, the core may send a broadcast query to all clients undergoing that specified task. One or more clients may respond to the core with the requested data. The requested data may include a return code and package information along with other possible data. However, if a return code is received, the core may need to look up additional information based on the return code. For example, the return code may be a number that corresponds to additional status information (e.g., code mapping) and each return code may be mapped to additional information in a database. This may be done to reduce the amount of data that needs to be transmitted from a client to the core. After looking up the status information, the core may display this information to the user.

Rather than looking up each received return code, the core may look up the entire return code mapping from a database and store it in a memory cache. The cache may be located on the core or externally to the core. Then, when a subsequent return code is received, the core may look up the subsequently received return code in the cache rather than in the database. This may result in a significant increase in efficiency, especially if the number of clients subjected to the specified task is large.

The core may also store the package information received from the first responding client in the memory cache. This cache may be the same or a different memory cache as is used to store the return code mappings. Additionally, the core may compare the received package information to package information stored on the core. Upon receipt of subsequently received package information from other clients, the core may discard the package information data if that data is redundant. For example, the package information for all clients relating to the same task may be identical.

Once the status information and package information is obtained for a client, the core may display that information to a user. Status information for additional clients may be displayed as their information is subsequently obtained. This process may occur with improved efficiency if the core accesses subsequent data that needs to be looked up and/or mapped from a cache rather than from a database.

The entire process may repeat itself when another task is selected by a user. For example, if a system administrator selects Task A, the cache may store the mapped data related to Task A. If Task B is subsequently selected, the mapped data related to Task B may be stored in the cache. The information relating to Task B may be stored in addition to or may replace the information relating to Task A.

The methods and systems described herein for improving the responsiveness of a computing device in connection with software distribution may provide numerous benefits. For example, a managed network with a thousand clients may take the core tens of minutes to receive a status update for a task, especially if each client requires separate calls to a database for code mappings. However, with the improved configurations disclosed herein, a status update for the same task may occur in a matter of seconds, or sub-seconds.

Various configurations of the systems and methods are now described with reference to the figures, where like reference numbers may indicate identical or functionally similar elements. The configurations of the present systems and methods, as generally described and illustrated in the figures herein, could be arranged and designed in a wide variety of different configurations. Thus, the following more detailed description of several configurations, as represented in the figures, is not intended to limit the scope of the systems and methods as claimed but is merely representative of the various configurations of the systems and methods.

FIG. 1 is a block diagram illustrating one configuration in which systems and methods for improving the responsiveness of a computing device 102 in connection with software distribution may be implemented. FIG. 1 shows a core 102, one or more client(s) 122 and a database 134. These components may be interconnected through a network 144. In some cases, the network 144 may be the Internet.

Examples of the core 102 and/or the one or more clients 122 include desktop computers, laptop computers, servers, supercomputers, smartphones, tablet devices, game consoles, e-readers and/or other devices that include memory and a processor. In some configurations, the core 102 may be a computing device. Additionally, the one or more clients 122 may be a computing device separate or remote from the core 102. In another configuration, the core 102 may be an administrative system and the one or more clients 122 may be managed node(s).

The core 102 may include a console 104, a package module 116, cache memory 118 and a communication interface 120. As used herein, a "module" or "engine" may be implemented in hardware, software or a combination of both. In one instance, the core 102 may be used in connection with LANDesk Management Suite.

The console 104 may be used to perform maintenance, monitoring and general life-cycle management on the one or more clients 122. For example, the console 104 may be a management application. The console 104 may send out queries, commands, requests, etc. to the one or more clients 122 on the network 144 via a communication interface 120. The console may categorize these actions into tasks 108. A task scheduler 106 may include various tasks 108. For example, tasks 108 may include scheduled tasks, specified tasks, public tasks, active tasks, pending tasks, successful tasks, failed tasks and/or all potential tasks 108. A task 108 may represent an action that is being performed on the one or more clients 122. A task 108 may also represent future actions to be performed on the one or more clients 122 on the network 144. A user may select a specific task 108 to obtain information such as status updates for each client 122 undergoing the specified task 108.

A task 108 may involve software distribution. For example, one or more pieces of software may be bundled into a package to be installed on the one or more clients 122. The package module 116 may facilitate creating, updating, monitoring and/or sending out packages. The package module 116 may be a component of the console 104, located elsewhere on the core 102 or even external to the core 102.

The package module 116 may create and assign custom and/or default mapping codes for each package. In other words, each return code or set of return codes may vary from package to package and from one task 108 to another. The package module 116 may also send a copy of the package information and return code mappings to a database 134 to be stored and later accessed by the core 102.

The cache memory (cache) 118 may be located on the console 104 or may be connected to the console 104. The cache 118 is generally a type of volatile memory such as random access memory (RAM). The console 104 may store information looked up in the database 134 in the cache 118. The database 134 may be non-volatile memory such as a hard drive, flash memory or other type of non-volatile memory. The database 134 may be located on the console 104 or externally on the network 144.

One or more clients 122 may be connected to the core 102 via the network 144. Each client 122 may include an agent 124 and a communication interface 132. The agent 124 may interact with the console 104 on the core 102. The agent 124 may include a package 126 that includes return codes 128 and package information 130. The package 126 may be sent to the one or more clients 122 by the package module 116 located on the core 102.

For example, the console 104 may determine that a software update for one or more clients 122 is required. The package module 116 may create and send a customized package 126 for the one or more clients 122. The package 124 may include the required software updates along with accompanying return codes 128 and package information 130. Each client 122 may receive the package 126 via the communication interface 132. In some instances, the package 126 may be sent by the core 102 via a secure connection on the network 144.

Upon request from the console 104, the agent 124 on each client 122 may send a return code 128 and package information 130 to the core 102. The return code 128 may indicate the current status of the package 126 on the one or more clients 122. For example, a first return code 128 from a first client 122 may indicate to the console 104 that the package 126 was successfully installed on the first client 122 while a second return code 128 from a second client 122 may indicate that the package 126 failed installation on the second client 122.

Each return code 128 may represent a unique value assigned to represent an exception handled by the one or more clients 122 during a software distribution. For example, a return code 128 may provide information on what happened to the one or more clients 122 during installation of a package 126. Some return codes 128 may signify that action is required by a user while others may notify a user of the presence of errors or success.

Additionally, the package information 130 may be used to convey information. For example, the package module 116 may send a copy of the package information (not shown) to the task 108 associated with overseeing the package installation on the one or more clients 122. Further, the package information 130 may also be used for confirmation purposes. For example, the task scheduler 106 may request package information (not shown) from the package module 116. When the core 102 receives package information 130 from the one or more clients 122, it may compare that package information 130 with the package information (not shown) located on the core 102. If it is a match, then the console 104 may continue processing the received data. For instance, the console 104 may continue processing the return code 128. Further, once package information 130 from a first client 122 is confirmed, the console 104 may store the package information 130 in a cache 118 and disregard subsequently received package information 130 from a subsequent client 122. In other words, the package information confirmation check may need to occur only once.

In other configurations, the package information 130 may be stored in a database 134 after it is received by the core 102. In some cases, the package 126 may include multiple software packages such as dependent packages. In these cases, the core 102 may receive package information 130 containing information regarding the plurality of dependent packages and store that information in the database 134 as package information 141. In other cases, the core 102 may store the received package information 130 in the cache 118 for future query lookups. Additionally and/or alternatively, package information 141 in the database 134 may include a plurality of received package information 130 from multiple clients 122 and display an overall status to a user. For example, when displaying the overall status, the core 102 may display the total successes and failures and/or the top failures for all clients 122 having the selected task 108.

In another configuration, the core 102 and/or console 104 may look up a code mapping related to the package 126, the package information 130 and/or the task 108. In one example, a code mapping may be additional information relating to a single return code 128, or it may be additional information relating to multiple return codes 128. Code mappings will be discussed in greater detail in connection with FIG. 2 and FIG. 5 below.

In yet another configuration, if the console 104 requests and receives a return code 128, the console 104 may need to look up the return code 128 in a database 134 to discover additional information. For instance, the additional information (e.g., code mapping) may include a return code 136, a message 138 and a code type 140. In another instance, the core 102 may send a return code 128 to the database 134 and may receive back one or more associated return codes 136, messages 138 and code types 140. This additional information may be displayed to the end user.

In some cases, the user may be shown the additional information along with data received from the one or more clients 122. For example, a system administrator may be shown the name of the one or more clients 122, each client's Internet Protocol (IP) address, status (e.g., code type), result (e.g., message), return code, etc.

In other cases, the console 104 may use the package information 130 and/or the specified task 108 to determine if the code mapping may be obtained from the cache 118 or must be obtained from the database 134. In other words, the console 104 may perform a cache 118 check. For example, if the console 104 did not perform a cache 118 check, it may improperly retrieve incorrect code mappings from the cache 118. For instance, the console 104 may obtain a code mapping regarding another package 126 or task 108 from the cache. This would result in the user being given incorrect information. However, if the console 104 uses the package information 130 and/or the specified task 108 to perform a cache 118 check, the console 104 may correctly identify if the cache 118 includes the specified task's 108 code mapping.

If it is determined that the code mapping relating to the specified task 108 is not in the cache 118, the console 104 may send the return code 128, the package information 130 and/or the specified task 108 to the database 134 to look up additional information pertaining to the task 108. Additionally, it may also retrieve the entire code mapping relating to all possible return codes 128 for the specified task 108. Once the console 104 has the code mapping, it may store it in the cache 118. Then subsequently received return codes 128 for the same task 108 may be looked up in the cache 118 rather than in the database 134.

The following is one specific example of how this process may occur. When the console 104 determines that the correct code mapping is not in the cache 118, the console 104 may look up the required information from a database 134. The console 104 may request information relating to a single return code 128 entry or multiple return code 128 entries. For example, each time the console 104 discovers a return code 128 not in the cache 118, it may send a request to look up that return code's 128 code mapping. Alternatively or additionally, the console 104 may request multiple or even all entries in the database 134 associated with the return code 128, the package information 130 and/or the specified task 108. The package information 130 or task 108 may be sent to the database 134 to help determine the correct code mapping to be employed or retrieved.

In one configuration, the cache 118 may not be able to hold all the code mapping entries. In this case, the less frequently accessed entries may be overwritten. Alternatively, another scheme for determining which entries to be overwritten in the cache 118 may be used.

Figure 2:
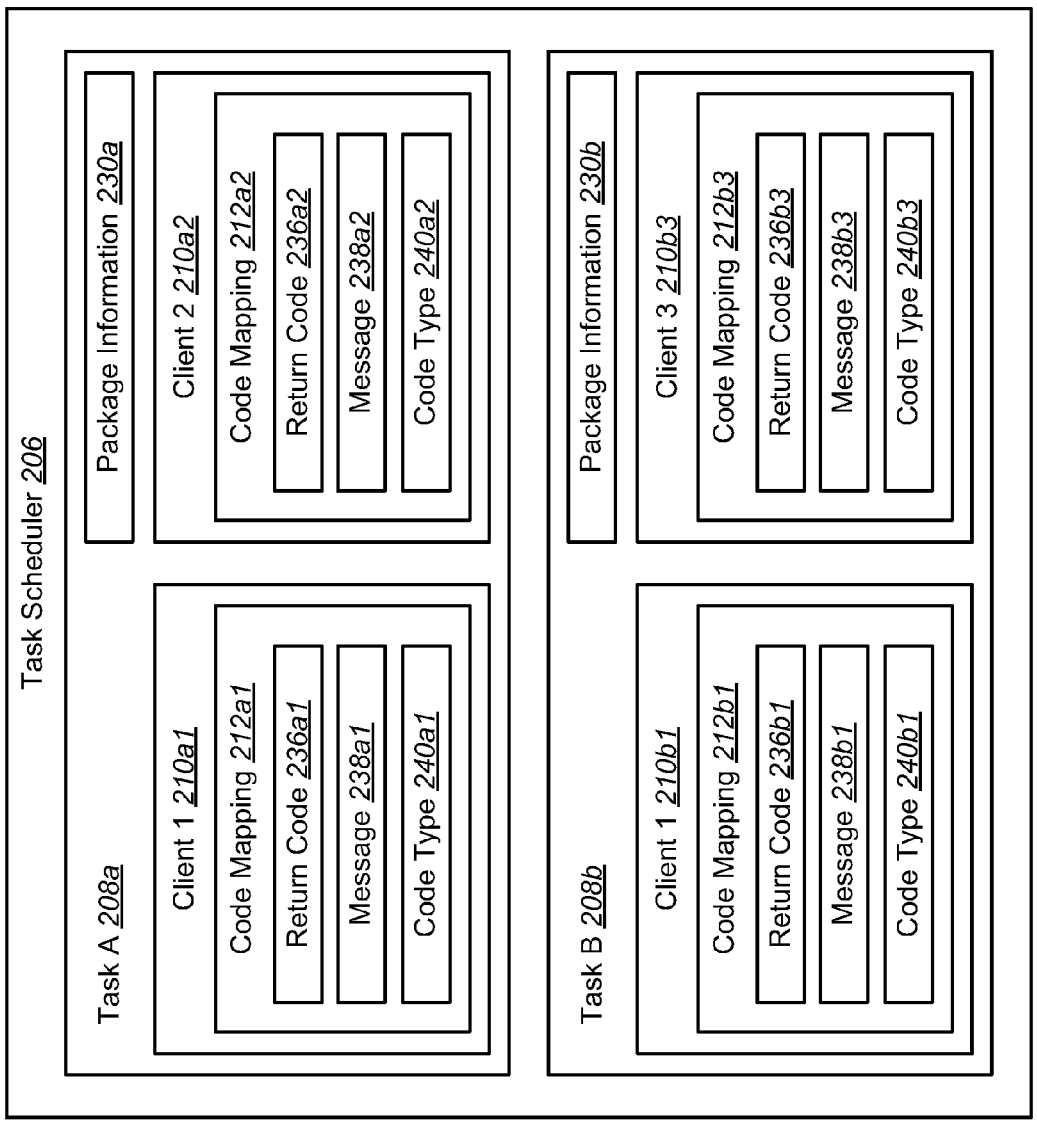
FIG. 2 is a diagram illustration one configuration of the task scheduler located on the core.

FIG. 2 is a diagram illustration one configuration of the task scheduler 206 located on the core 102. The task scheduler 206 in FIG. 2 is an example of the task scheduler 106 discussed in connection with FIG. 1. The task scheduler 206 may include one or more tasks 208. Each task 208 may include a list of one or more clients 210 and package information 230. Each client 210 may represent the one or more clients 122 discussed above in connection with FIG. 1. Additionally, tasks 208 described in FIG. 2 may be specific examples of the tasks 108 discussed in connection with FIG. 1 described above. For example, a task 208 may represent an action that is being performed, or is scheduled to be performed, on the one or more clients 210. Similarly, a user may select a specific task 208 to obtain information such as a status update for each of the one or more clients 210 undergoing the specified task 208.

The task scheduler 206 may display a list of tasks 208. In some instances, these tasks 208 may be laid out in a tree data structure. In this case, each task 208 may represent a base level tree node. Upon selection of the base level tree node or task 208 by a user, each client 210 associated with the selected or specified tasks 208 may be displayed to a user as a child node. Each client 210 may further display information to a user in the form of additional child nodes. Additionally, display information may be shown elsewhere in the console 104, such as in a display window (not shown).

In one example, the task scheduler 206 includes two tasks 208, Task A 208a and Task B 208b. Task A 208a includes two clients 210, Client 1 210a1 and Client 2 210a2. Client 1 210a1 may include a code mapping 212a1. The code mapping 212a1 may include a return code 236a1, a message 238a1 and/or a code type 240a1. The code mapping 212a1 may be obtained from the cache 118, or from the database 134 if it is not in the cache 118.

For instance, if a user (e.g., system administrator) requests a status update regarding Task A 208a, the console 104 may broadcast a request to Client 1 210a1 and Client 2 210a2. If Client 1 212a1 responds first with a return code 236a1 and package information 230a, then the console 104 may need to look up the code mapping 212a1 from the database 134 if the code mapping 212a1 is not already stored in the cache 118. Once the code mapping 212a1 is obtained, the console 104 may store the code mapping 212a1 in the cache 118. If Client 2 210a2 subsequently sends a return code 236a2 and package information 230a to the console 104, the console 104 may check to see if the return code 236a2 is stored in the cache 118. If it is, then the console 104 can look up Client 2's 210a2 code mapping 212a2 in the cache 118. In other words, the return code 236a2, message 238a2 and code type 240a2 for Client 2 210a2 may be looked up in the cache 118 rather than the database 134. Thus, the code mapping 212a2 from Client 2 210a2 may be obtained and displayed to a user with increased responsiveness.

Task A 208a may also include package information 230a. The package information 230a may be associated with Task A 208a. For example, the package information 230a may be displayed in the task scheduler 206 next to Task A 208a. Additionally or alternatively, the package information 230a may be shown in connection with each client 210a. For example, if Task A 208a is a base level tree node and Client 1 210a1 and Client 2 210a2 are child nodes, the package information 230a may be displayed along with each client 210a belonging to Task A 208a.

After requesting and receiving information regarding Task A 208a, the system administrator may request information relating to Task B 208b. Task B 208b may include Client 1 210b1 and Client 3 210b3. In some cases, the same client(s) 210 may be listed under multiple tasks 208. For example, Client 1 may list under Task A 208a as Client 1 210a1 and also listed under Task B 208*b* as Client 1 210*b*1. This is because clients 210 may be associated with different specific tasks 208.

Task B 208*b* may also include package information 230*b*. The package information 230*b* may be received from the package module 116 and/or may be received from the clients 210*b* under Task B 208*b*.

When the system administrator requests a status update regarding Task B 208*b*, the console 104 broadcasts a request to the clients 210*b* in Task B 208*b*. If Client 3 210*b*3 responds first with a return code 236*b*3 and package information 230*b*, the console 104 may need to look up the code mapping 212*b*3 from the database 134. This may be the case because the cache 118 is still storing the code mapping 212*a* of Task A 208*a*.

In one instance, the cache 118 may only store the code mappings 212 for one task 208 at a time. In this case, then for each subsequently displayed task 208 (e.g., Task B 208*b*), the console 104 must look up the subsequent code mapping 212*b* in the database 134 and store it on the cache 118 to replace the previous code mapping 212. In another instance, the cache 118 may be able to store multiple code mappings 212 (e.g., code mappings 212*a* and 212*b*). In this case, the console 104 may discover that both code mappings 212 are already stored in the cache 118.

Client 1 210*b*1 and Client 3 210*b*3 in Task B 208*b* may receive a code mapping 212*b* similar to the code mapping 212*a* described in connection with Task A 208*a*. For example, Client 3 210*b*3 may respond first with a return code 236*b*3 and package information 230*b*, the console 104 may need to look up the code mapping 212*b*3 from the database 134 and store the code mapping 212*b*3 in the cache 118. In this instance, the console 104 may look up Client 3's 210*b*3 code mapping 212*b*3 (e.g., return code 236*b*3, message 238*b*3 and code type 240*b*3) along with all code mappings 212*b* (e.g., all return codes 236*b*, messages 238*b* and code types 240*b*) relating to Task B 208*b* and/or package information 230*b*. Then, when Client 1 210*b*1 subsequently sends a return code 236*b*1 and package information 230*b* to the console 104, the console 104 can look up the code mapping 212*b*1 (e.g., return code 236*b*1, message 238*b*1 and code type 240*b*1) in the cache 118 rather than making a call to the remote database 134.

Figure 3:
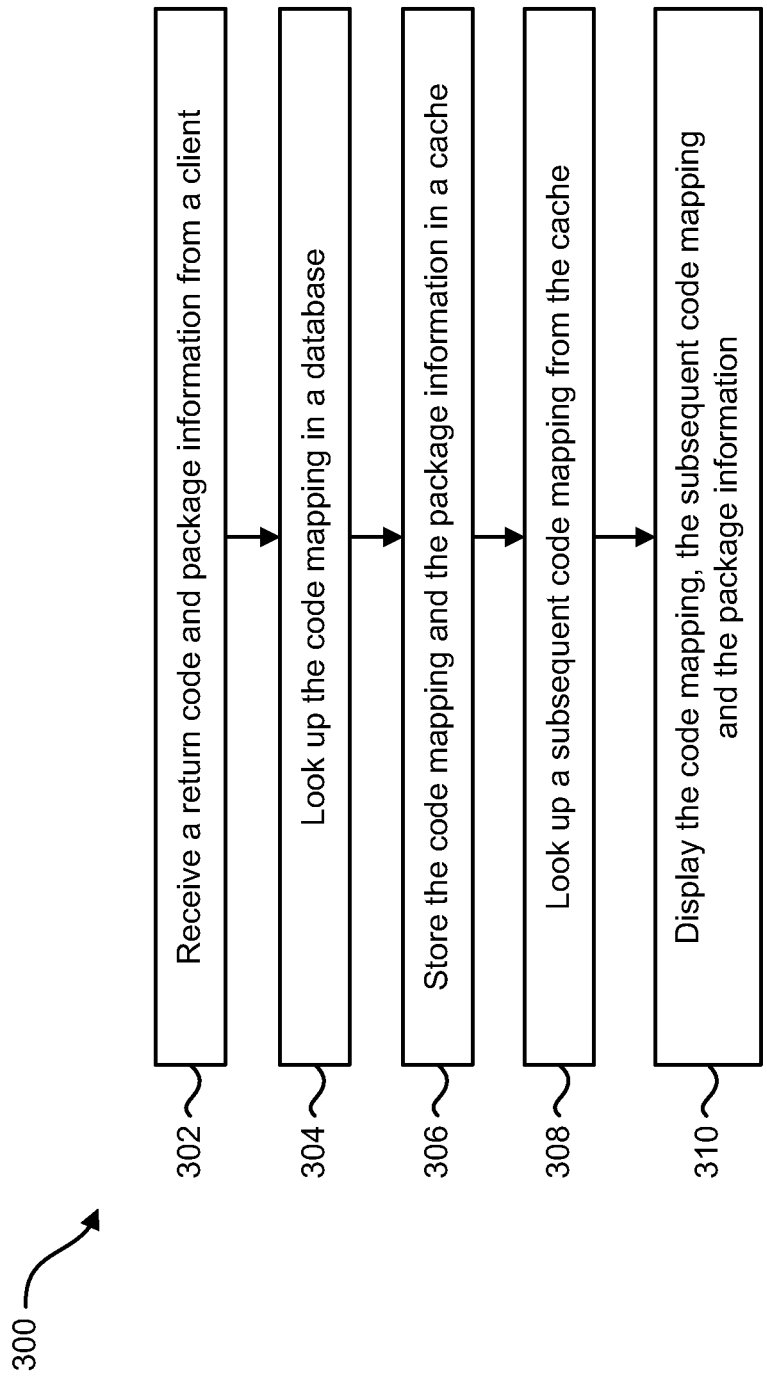
FIG. 3 is a flow diagram illustrating one method for improving the responsiveness of a computing device.

FIG. 3 is a flow diagram illustrating one method 300 for improving the responsiveness of a computing device. The core 102 may receive 302 a return code 128 and package information 130 from one or more clients 122. For example, the return code 128 may be a number, a letter, a character, a string and/or a combination thereof. The package information 130 may include a package ID, a package name and/or the package return code (e.g., return code 128).

In some configurations, there may be multiple packages. In these cases, the package information 130 for a single package may be tracked. For example, the package name of the main package may be returned. As another example, if there are multiple packages, such as if the main package 126 includes dependent packages, and any one of those dependent packages fail, the failing package return code may be tracked and returned. In some cases, the package return code 128 may be an integer value. In other cases where there may be multiple packages in the package installation, the return code 128 for the entire installation operation may be either the first failing package return code or the main package success return code. For example, the one or more clients 122 may process each dependent return code to validate that the dependent package has successfully installed, and if one dependent package fails to install, there may be no reason to continue the other dependent packaged installations. Thus, the return code for that failed dependent package may be returned to the core 102 along with package information 130 regarding both the main package 126 and the failed dependent package.

Additionally or alternatively, the core 102 may receive the return code 128 and package information 130 from the one or more clients 122 in response to the core 102 sending a software package to the one or more clients 122. For example, in a push based task system, the core 102 may wait to receive 302 return codes 128 for each command that is run on the one or more clients 122. As another example, in a pull based task system, the one or more clients 122 may send their status on independently when they run the selected task 108.

Upon receiving 302 the return code 128 and package information 130, the return code 128 may be used to look up 304 the code mapping 212 in the cache 118. In some cases, if the code mapping 212 is not in the cache, the core 102 may look up the code mapping 212 in a database 134. For example, the core 102 may request that a database 134 on the network 144 look up 304 additional information (e.g., a return code 136, message 138 and code type 140) based on the return code 128 received from one or more clients 122. Upon receiving the return code 128 and package information 130, the core 102 may also send the task 108 and/or the package information 130 to the cache 118 and/or database 134 to assist in identifying the correct code mapping 212.

The core 102 may store 306 the code mapping 212 and/or the package information 130 in a cache 118. The cache 118 may be located on the core 102, for example. In some cases, upon receiving 302 subsequent return codes 128 and package information 130 from subsequent clients, the core 102 may look up 308 a subsequent code mapping 212 from the cache 118 rather than from the database 134. For each client 122 for which the core 102 receives 302 a return code, the core 102 may display 310 the code mapping 212 and package information 130 to a user. For example, if the core 102 receives 302 return codes 128 first from Client 1 210*a*1 and subsequently from Client 2 210*a*2, the core 102 may display 310 the code mapping 212*a*1, the subsequent code mapping 212*a*2 and the package information 230*a*. In some instances, the code mapping 212*a*1 and the subsequent code mapping 212*a*2 may be the same.

Figure 4:
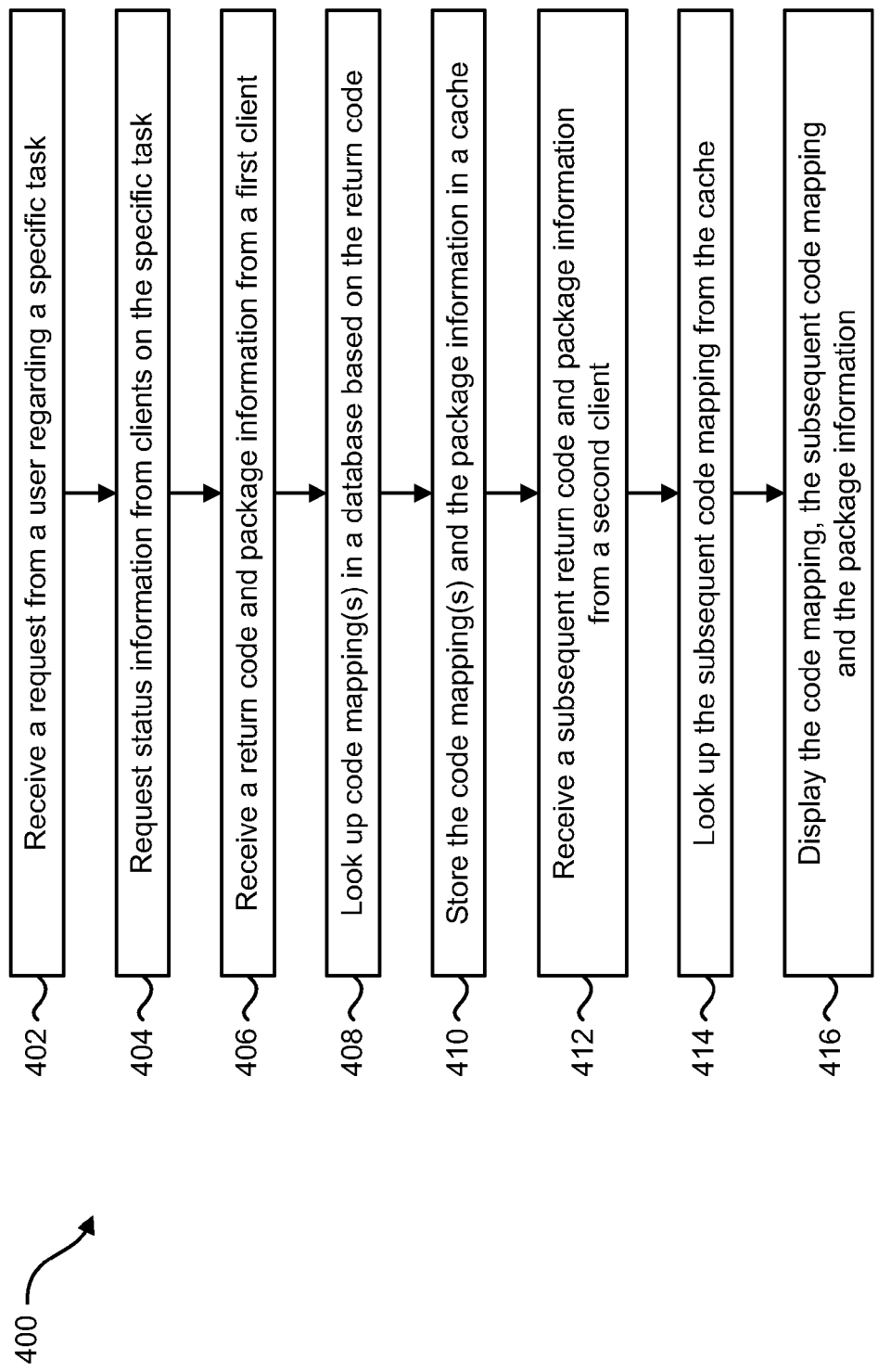
FIG. 4 is a flow diagram illustrating a method for improving the responsiveness of a computing device.

FIG. 4 is a flow diagram illustrating a method 400 for improving the responsiveness of a computing device. The core 102 may receive 402 a request from a user regarding a specific task 108. For example, a user such as a system administrator may select or give focus to a task 108 and request information regarding the specified task 108. Then, the core 102 may request 404 status information from the one or more clients 122 regarding the specified task 108.

In some configurations, when the core 102 makes the request 404 for status information from the one or more clients 122 for the selected task 108, the core 102 may also look up 406 the return code mappings 212 from the database 134. The look up function may be based on the selected task 108 and/or the user request. Upon receiving the code mappings 212 from the database 134, the core 102 may store 408 the code mappings 212 in the cache 118.

In response to the request 404, the core 102 may receive 406 a return code 128 and package information 130 from the one or more clients 122 corresponding to the specified task 108. Alternatively or additionally, the one or more clients 122 may send status information to the core 102 at a predetermined time. For example, a client 122 may be programmed to send a return code 128 to the core 102 upon completion (e.g., success or failure) of a package 126 installation.

In some configurations, the core 102 may receive 410 a return code 236*a*1 and package information 230*a* from a first client 210*a*1. The first client 210*a*1 may send a return code 236*a*1 and package information 230*a* when multiple clients 210 on the network 144 are queried. Based on the return code 236*a*1 received 410, the core 102 may look up 408 code mappings 212*a* in a database 134. This may occur because the code mappings 212*a* have not yet been stored in the cache 118. Otherwise, the core 102 may look up 414 the code mappings from the cache 118. For example, this may occur if the one or more clients 112 are sending return codes 128 to the core 102 at arbitrary times. In that case, the code mappings 212*a* looked up 408 in the database 134 may then be stored 410 in a cache 118. The package information 230*a* may also be stored 410 in the cache 118.

Upon receiving 410 the return code 236*a*1 and package information 230*a* from the first client 210*a*1, the core 102 may store 412 the package information 130 in the cache 118 and/or database 134. The processes of storing 412 package information may occur for each packet information 130 received. In this way, the core 102 may be able to later present to the user the over status report of combined successes and failures of software distribution.

In some configurations, the core 102 may also receive 410 a subsequent return code 236*a*2 and package information 230*a* from a second client 210*a*2 for the same task 208. Because the code mapping 212*a*2 for the second client 210*a*2 may be the same as the code mapping 212*a*1 for the first client 210*a*1, the core 102 looks up 414 the subsequent code mapping 212*a*2 from the cache 118. For example, the subsequent code mapping 212*a*2 may be based on the previously looked up 406 return code 236*a*1. This may be accomplished similarly to the way the core 102 looks up 414 the code mapping 212 from the cache 118 upon receipt of the first return code 236*a*1 from the first client 210*a*1.

Once code mappings 212*a* are obtained, the core 102 may display 416 the code mapping 212*a*1, the subsequent code mapping 212*a*2, and the package information 230*a*. For example, the code mapping 212*a*1, the subsequent code mapping 212*a*2, and the package information 230*a* may be displayed to a user, such as a system administrator. The core 102 may display 416 the status information for each client 210*a* simultaneously or may display 416 the information as it is received 402 and 412.

FIG. 5 is a diagram illustrating one configuration for code mapping in a database 534. The database 534 may include return codes 536, messages 538 and/or code types 540. The return codes 536 may be a number, digit, letter, character, string and/or any combination thereof. Each return code 536 may be associated with a specific message 538 and code type 540. For example, return code 536 "0" may be associated with the message 538, "Successful install" and code type 540, "Success." As another example, when the core 102 sends a received return code 128 from a client 122 with a value of "2", the database 534 may look up "2" under return code 536 "2." The database 534 may then return the message 538, "Fatal error during installation" and code type 540, "Failed."

Additionally or alternatively, the database 534 may return all values for each return code 536, message 538 and code type 540. For example, upon receiving a request for additional information from the core 102, the database 534 may return multiple and/or all entries in the database 534. For instance, the database 534 may return {0, Successful install, Success}, {1, Data is invalid, Failed}, {2, Fatal error during installation, Failed}, {3, User canceled installation, Failed}, {4, Parameter is invalid, Failed}, {n, Message n, Code type n}. As an example, Code type n may represent "successful," "failed," "pending," "active," "not specified" or a variety of other code types 540. The core 102 may then store this information in a cache 118. Then, when the core 102 receives a subsequent return codes 128 from one or more clients 122, the core 102 can use the data stored in the cache 118 to retrieve the additional information (e.g., return code 536, message 538 and code type 540).

Figure 6:
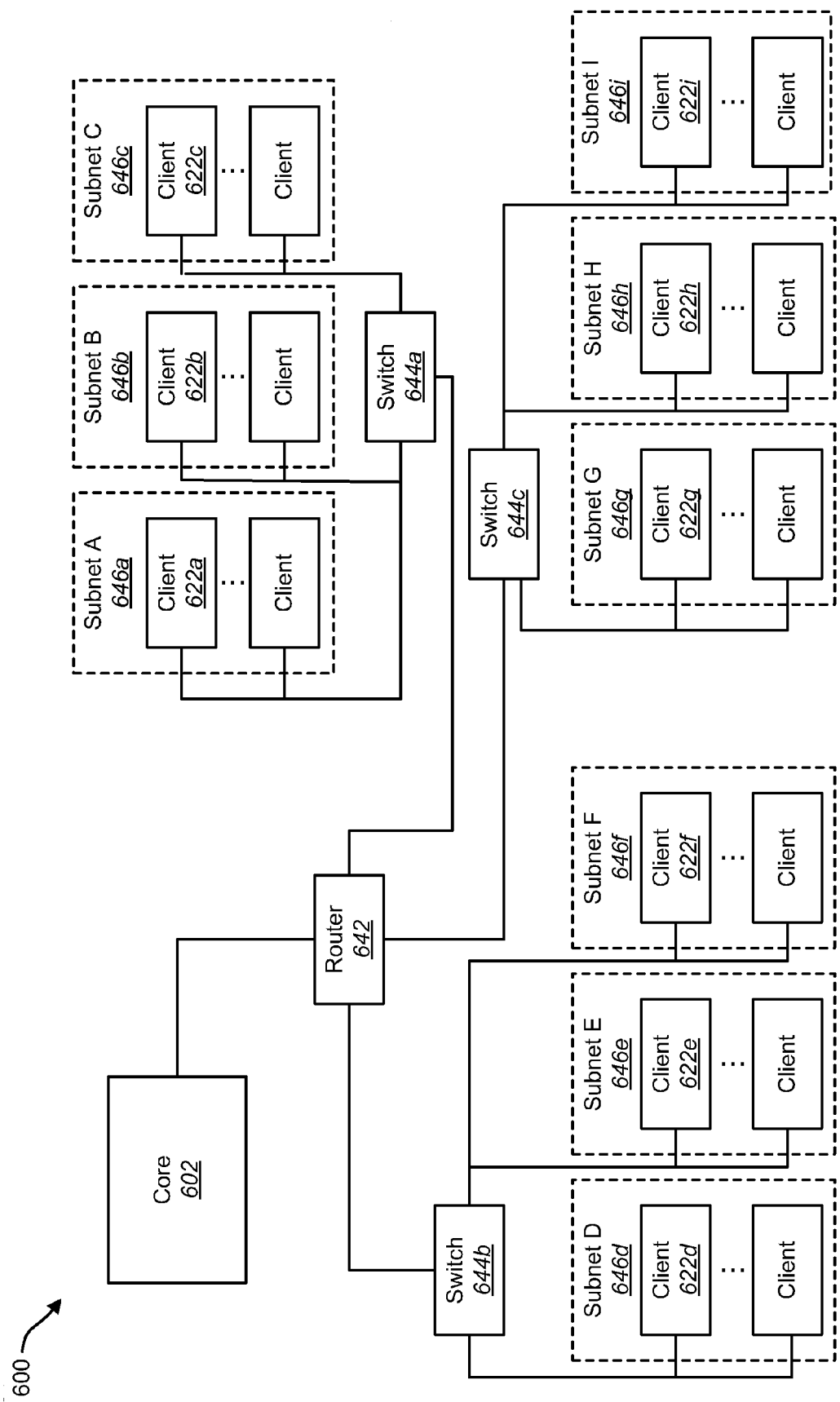
FIG. 6 is a block diagram illustrating a configuration of a network where systems and methods for improving the responsiveness of a computing device may be implemented.

FIG. 6 is a block diagram illustrating a configuration of a network 600 where systems and methods for improving the responsiveness of a computing device (e.g., core) 602 may be implemented. A core 602 (e.g., computing device and/or administrative system) may be connected to a router 642. The router 642 may be connected to switches 644*a*, 644*b*, 644*c*. The switch 644*a* may be connected to several clients (e.g., managed nodes and/or mobile devices) 622*a*, 622*b* and 622*c*, via their respective subnets 646*a*, 646*b* and 646*c*. The switch 644*b* may be connected to several clients 622*d*, 622*e* and 622*f*, via their respective subnets 646*d*, 646*e* and 646*f*. The switch 644*c* is connected to several clients 622*g*, 622*h* and 622*i*, via their respective subnets 646*g*, 646*h* and 646*i*. Although FIG. 6 only shows one router 642 and a limited number of switches 644, subnets 646 and clients 622, a varied numbers of routers 642, switches 644, subnets 646 and clients 622 may be included in networks and/or systems where methods and systems for improving the responsiveness of a computing device 602 may be implemented. It should be noted that the core 602 illustrated in FIG. 6 may be configured similarly to the core 102 described above. It should also be noted that the clients 622 illustrated in FIG. 6 may be configured similarly to the clients 112 described above.

Figure 7:
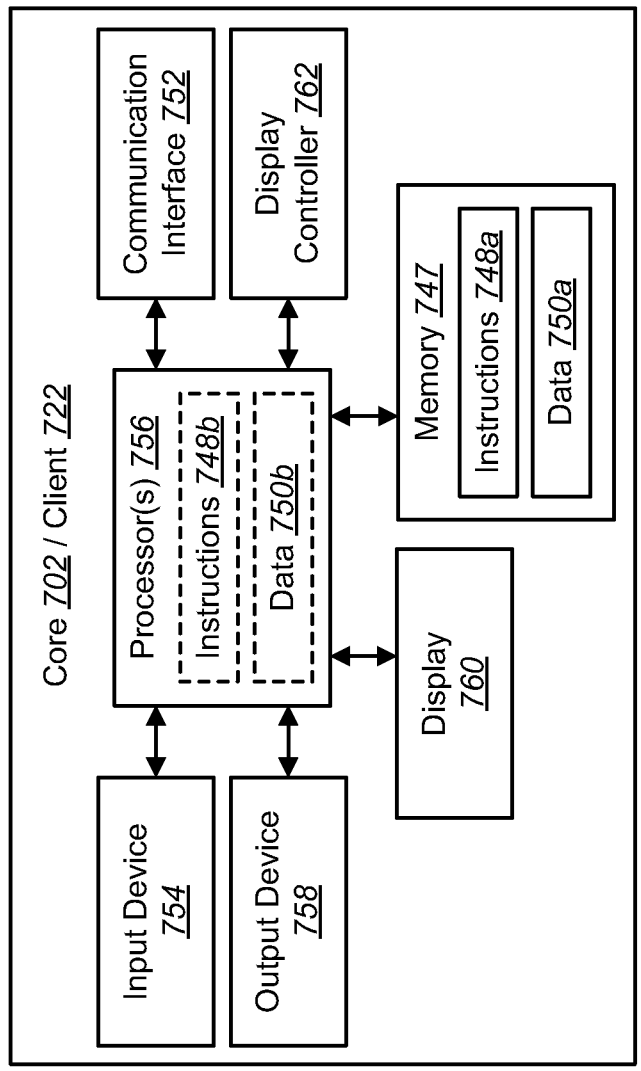
FIG. 7 illustrates various components that may be utilized in the core and/or client.

FIG. 7 illustrates various components that may be utilized in the core 702 and/or client 722. The illustrated components may be located within the same physical structure or in separate housings or structures.

The core 702 or client 722 may include one or more processor(s) 756 and memory 747. The memory 747 may include instructions 748*a* and data 750*a*. The processor 756 controls the operation of the core 702 or client 722 and may be, for example, a microprocessor, a microcontroller, a digital signal processor (DSP) or other device known in the art. The processor 756 may be in electronic communication with the memory 747. The processor 756 typically performs logical and arithmetic operations based on program instructions 748*b* and/or data 750*b* it loads from the memory 747.

The core 702 or client 722 typically may include one or more communication interfaces 752 for communicating with other electronic devices. The communication interfaces 752 may be based on wired communication technology, wireless communication technology or both. Examples of different types of communication interfaces 752 include a serial port, a parallel port, a Universal Serial Bus (USB) port, an Ethernet adapter, an IEEE 1394 bus interface, a small computer system interface (SCSI) bus interface, an infrared (IR) communication port, a Bluetooth wireless communication adapter, a network storage device, an external hard drive, an optical drive (e.g., Compact Disc (CD) drive, Digital Video Disc (DVD) drive, Blu-ray drive, etc.) and so forth.

The core 702 or client 722 typically may include one or more input devices 754. Examples of different kinds of input devices 754 include a keyboard, mouse, microphone, remote control device, button, joystick, trackball, touchpad, lightpen, camera and/or other input device 754. The input device 754 may receive input from another device and/or from a user of the core 702 or client 722. The input device 754 may include multiple devices, blocks and/or modules that the core 702 or client 722 may use to receive information. For instance, an input device 754 may be an Ethernet card that can receive information from another computing device connected to a network 144, 544. In another example, the input device 754 may be a computer mouse that may be used by the core 702 or the client 722 to detect user interaction such as a "click" on an icon and/or translation of a cursor.

The core 702 or client 722 typically may include one or more output devices 758. Examples of different kinds of output devices 758 include displays, projectors, speakers, tactile devices, network cards, wireless transmitters, infrared transmitters, lights, etc. The output device 758 may output, transmit, send, display, project, emit and/or convey information to another device and/or to a user of the core 702 or client 722. For instance, the output device 758 may be a monitor that can display information (e.g., images) to a user. In another example, the output device 758 may be a network card that can transmit information to another computing device connected to a network. In some configurations, the output device 758 may display a graphical user interface (GUI) to facilitate user interaction. For example, the client 722 may display a window with icons that a user may interact with using a keyboard and/or mouse (e.g., "keyboard/mouse").

One specific type of output device that may typically be included in a core 702 or client 722 is a display device 760. Display devices 760 used with configurations disclosed herein may utilize any suitable image projection technology, such as a cathode ray tube (CRT), liquid crystal display (LCD), light-emitting diode (LED), gas plasma, electroluminescence or the like. A display controller 762 may also be provided for converting data 750a stored in the memory 747 into text, graphics and/or moving images (as appropriate) shown on the display device 760.

Of course, FIG. 7 illustrates only one possible configuration of a core 702 or client 722. Various other architectures and components may be utilized.

In the above description, reference numbers have sometimes been used in connection with various terms. Where a term is used in connection with a reference number, this may refer to a specific element that is shown in one or more of the figures. Where a term is used without a reference number, this may refer generally to the term without limitation to any particular figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

Unless otherwise specified, the term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of non-transitory computer-readable statement(s). For example, the terms "instructions" and "code" may refer to one or more programs, routines, subroutines, functions, procedures, etc. "Instructions" and "code" may have a single computer-readable statement or many computer-readable statements.

The term "computer-readable medium" refers to any available medium that can be accessed by a computer or processor. By way of example, and not limitation, a computer-readable medium may have RAM, ROM, EEPROM, CD-ROM or other optical disk storage, magnetic disk storage or other magnetic storage devices, or any other medium that can carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be non-transitory and tangible.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein include one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A computing device configured for improving responsiveness in connection with software distribution, comprising:
   a processor;
   memory in electronic communication with the processor;
   instructions stored in the memory, the instructions being executable to:
   send a software package to a remote computing device to be installed on the remote computing device;

receive a return code and package information from the remote computing device in response to the computing device sending the software package to the remote computing device;

look up a code mapping in a cache, wherein the code mapping is based on the return code;

store the package information in a database; and display the code mapping and the package information.

2. The computing device of claim 1, wherein the code mapping comprises the return code, a message and a code type.

3. The computing device of claim 1, wherein looking up the code mapping returns a plurality of code mappings to be stored in the cache.

4. The computing device of claim 1, wherein the code mapping is based on at least one of a task and received package information.

5. The computing device of claim 1, wherein the instructions are further executable to discard subsequently received package information.

6. The computing device of claim 1, wherein the instructions are further executable to display the code mapping and the package information on a task scheduler.

7. A method for improving responsiveness of a computing device in connection with software distribution, comprising:

sending a software package to a remote computing device to be installed on the remote computing device;

receiving a return code and package information from the remote computing device in response to the sending the software package to the remote computing device;

looking up a code mapping in a cache, wherein the code mapping is based on the return code;

storing the package information in a database; and displaying the code mapping and the package information.

8. The method of claim 7, wherein the code mapping comprises the return code, a message and a code type.

9. The method of claim 7, wherein looking up the code mapping returns a plurality of code mappings to be stored in the cache.

10. The method of claim 7, wherein the code mapping is based on at least one of a task and received package information.

11. The method of claim 7, further comprising discarding subsequently received package information.

12. The method of claim 7, further comprising displaying the code mapping and package information on a task scheduler.

13. A non-transitory computer-readable medium for improving responsiveness of a computing device in connection with software distribution comprising executable instructions for:

sending a software package to a remote computing device to be installed on the remote computing device;

receiving a return code and package information from the remote computing device in response to the sending the software package to the remote computing device;

looking up a code mapping in a cache, wherein the code mapping is based on the return code;

storing the package information in a database; and displaying the code mapping and the package information.

14. The computer-readable medium of claim 13, wherein looking up the code mapping returns a plurality of code mappings to be stored in the cache.

* * * * *